US010041494B2

(12) United States Patent
Mizufune et al.

(10) Patent No.: US 10,041,494 B2
(45) Date of Patent: Aug. 7, 2018

(54) AIR COMPRESSION APPARATUS (71) Applicant: NABTESCO CORPORATION, Tokyo (JP)

(72) Inventors: Toru Mizufune, Hyogo (JP); Masaru Kuromitsu, Hyogo (JP); Akira Takahashi, Hyogo (JP); Tatsuo Miyauchi, Hyogo (JP)

(73) Assignee: NABTESCO CORPORATION, Tokyo (JP)

( * ) Notice: Subject to any disclaimer, the term of this patent is extended or adjusted under 35 U.S.C. 154(b) by 324 days.

(21) Appl. No.: 14/704,312

(22) Filed: May 5, 2015

(65) Prior Publication Data

US 2015/0330408 A1 Nov. 19, 2015

(30) Foreign Application Priority Data

May 15, 2014 (JP) .................. 2014-101847

(51) Int. Cl.
*F04B 39/00* (2006.01)
*F04C 23/00* (2006.01)
(Continued)

(52) U.S. Cl.
CPC .............. *F04C 23/00* (2013.01); *B60H 1/32* (2013.01); *F04C 29/04* (2013.01); *F25B 9/004* (2013.01);
(Continued)

(58) Field of Classification Search
CPC .. F04C 23/00; F04C 29/04; F04C 2210/1005; F04C 18/0207; F25B 9/004;
(Continued)

(56) References Cited

U.S. PATENT DOCUMENTS 2,381,296 A * 8/1945 Lynn .................. H02K 1/32
310/63
5,358,387 A * 10/1994 Suzuki .................. F04C 18/023
417/295
(Continued)

FOREIGN PATENT DOCUMENTS

CN 101398004 A 4/2009
CN 101832256 A 9/2010
(Continued)

OTHER PUBLICATIONS

Notification of Reason for Refusal as issued in Korean Patent Application No. 10-2015-0066096, dated Oct. 10, 2016.
(Continued)

*Primary Examiner* — Charles Freay
(74) *Attorney, Agent, or Firm* — Pillsbury Winthrop Shaw Pittman, LLP (57) ABSTRACT

The present application discloses an air compression apparatus mounted on a vehicle. The air compression apparatus includes a first air compressor configured to generate first compressed air, a first cooling fan configured to send first cooling wind in a first direction to cool the first air compressor, and a second air compressor aligned with the first air compressor in a second direction intersecting with the first direction. The second air compressor generates second compressed air.

15 Claims, 8 Drawing Sheets (51) Int. Cl.
  B60H 1/32 (2006.01)
  F25B 9/00 (2006.01)
  F04C 29/04 (2006.01)
  F04D 17/08 (2006.01)
  F04D 25/16 (2006.01)
  F04C 18/02 (2006.01)

(52) U.S. Cl.
  CPC .. *F04C 18/0207* (2013.01); *F04C 2210/1005* (2013.01); *F04D 17/08* (2013.01); *F04D 25/16* (2013.01); *F25B 2400/06* (2013.01)

(58) Field of Classification Search
  CPC ....... F25B 2400/06; B60H 1/32; F04D 17/08; F04D 25/16
  USPC .......................................................... 310/63
  See application file for complete search history.

(56) References Cited

U.S. PATENT DOCUMENTS

| | | | | |
|---|---|---|---|---|
| 5,507,618 | A * | 4/1996 | Kubo | F04C 29/04 165/47 |
| 6,190,145 | B1 * | 2/2001 | Fujioka | F04C 29/04 417/371 |
| 6,193,486 | B1 * | 2/2001 | Shiinoki | F04C 29/04 418/101 |
| 6,511,082 | B2 * | 1/2003 | Shirai | B62B 3/008 280/33.991 |
| 2006/0280626 | A1 * | 12/2006 | Nishimura | F01C 21/007 417/410.4 |
| 2008/0298984 | A1 | 12/2008 | Barberis et al. | |
| 2009/0087320 | A1 | 4/2009 | Tanaka et al. | |
| 2010/0232980 | A1 | 9/2010 | Tanaka et al. | |
| 2013/0136643 | A1 * | 5/2013 | Yabe | F04C 29/04 418/83 |
| 2013/0175893 | A1 * | 7/2013 | Stenvall | B60K 1/00 310/63 |
| 2014/0314586 | A1 * | 10/2014 | Kanaizumi | F04C 23/001 417/362 |

FOREIGN PATENT DOCUMENTS

| | | |
|---|---|---|
| JP | 2005-076481 A | 3/2005 |
| JP | 2005-207370 A | 8/2005 |
| JP | 3150077 U | 4/2009 |
| JP | 2010-077893 A | 4/2010 |
| JP | 2011-226285 A | 11/2011 |
| JP | 2012-012984 A | 1/2012 |

OTHER PUBLICATIONS

Office Action as issued in Chinese Patent Application No. 201510250097.6, dated Dec. 5, 2016.
Extended Search Report as issued in European Patent Application No. 15166715.1 dated Jun. 23, 2015.
Notification of Reasons for Refusal Japanese Patent Application No. 2014-101847 dated Feb. 27, 2018 with English translation.

* cited by examiner

AIR COMPRESSION APPARATUS

TECHNICAL FIELD

The present invention relates to an air compression apparatus mounted on a vehicle.

BACKGROUND ART

Japanese Registered Utility Model Publication No. 3150077 (JP 3150077 U) discloses an air compression apparatus mounted on a vehicle. The air compression apparatus is designed to generate compressed air for use in a vehicle. The air compression apparatus disclosed in JP 3150077 U includes scroll air compressors. The scroll air compressors are adjacently aligned with each other in a storage box. Therefore, a designer may give the air compression apparatus small dimensional values.

When the air compression apparatus operates to generate compressed air at high pressure, the air compressors emit a large amount of heat. Although the adjacent arrangement of the air compressors contributes to downsizing the air compression apparatus, it is unsuited for efficient heat removal.

JP 3150077 U discloses an after-cooler for cooling compressed air which is generated by compression in the air compressors. However, JP 3150077 U does not suggest efficient removal of heat generated from the air compressors at all.

It is an object of the present invention to provide techniques for efficiently cooling air compressors which are adjacently arranged.

SUMMARY OF INVENTION

An air compression apparatus according to one aspect of the present invention is mounted on a vehicle. The air compression apparatus includes a first air compressor configured to generate first compressed air, a first cooling fan configured to send first cooling wind in a first direction to cool the first air compressor, and a second air compressor aligned with the first air compressor in a second direction intersecting with the first direction. The second air compressor generates second compressed air.

According to the aforementioned configuration, the first and second air compressors are aligned with each other in the second direction intersecting with the first direction along which the first cooling fan sends the first cooling wind. Therefore, the first cooling fan may efficiently cool the first air compressor even when the second air compressor is situated near the first air compressor.

Other objects, features and advantages of the aforementioned air compression apparatus will be apparent from the following detailed description and the accompanying drawings.

DESCRIPTION OF EMBODIMENTS

An exemplificative air compression apparatus is described with reference to the drawings. Principles of the present embodiment may be widely applied to various air compression apparatuses mounted on vehicles.

[Placement of Air Compression Apparatus]

Figure 1:
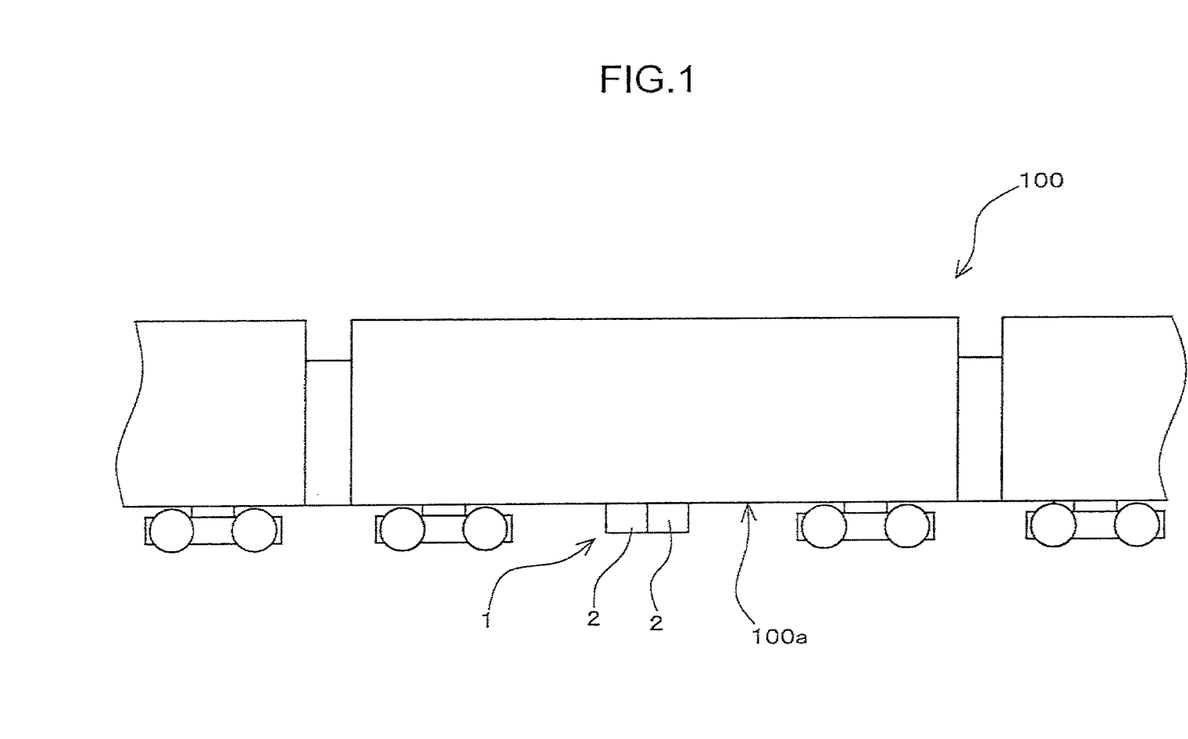
FIG. 1 is a schematic view of an exemplificative air compression apparatus mounted on a vehicle.
Figure 2:
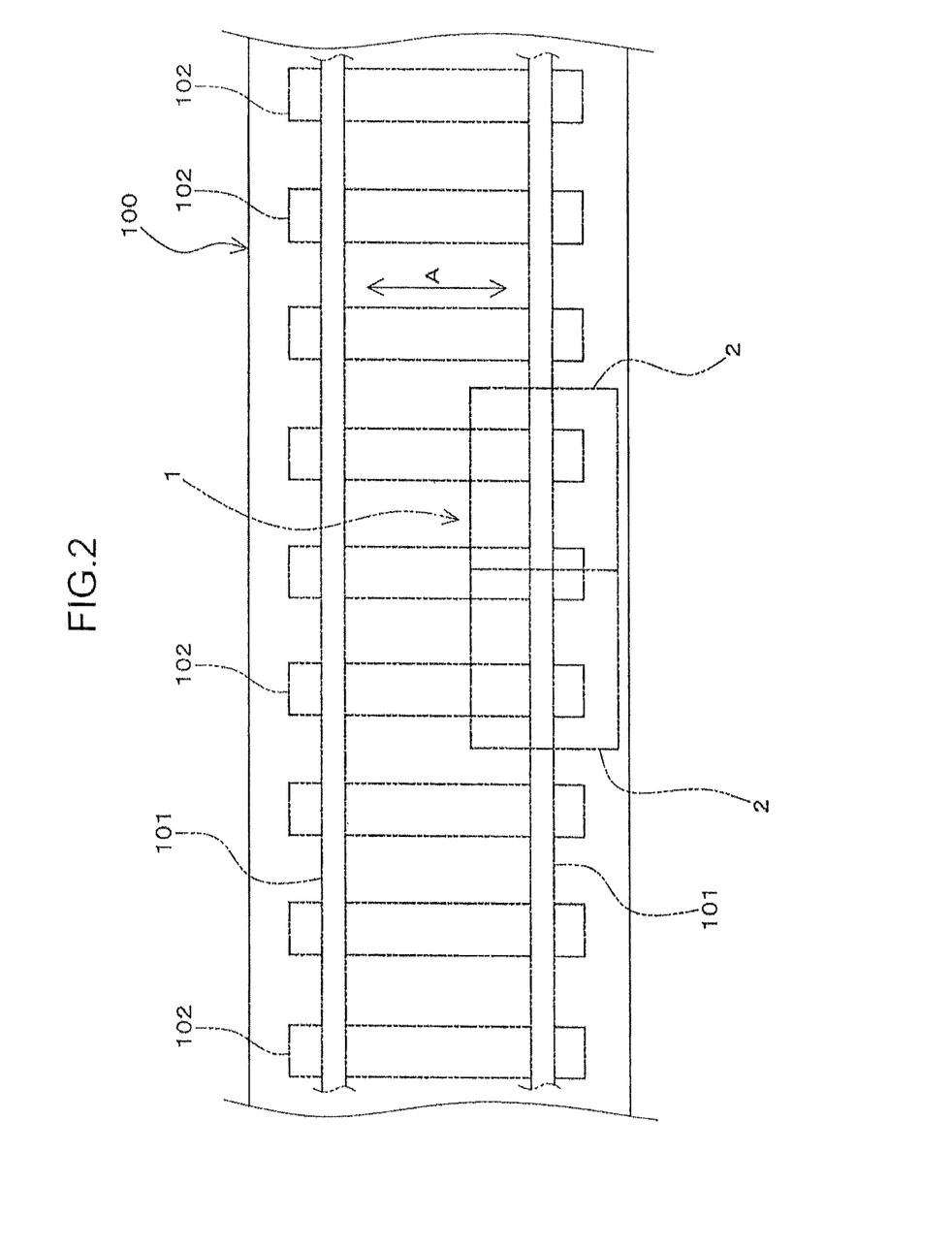
FIG. 2 is a schematic top plan view showing a mounting position of the air compression apparatus illustrated in FIG. 1.

FIG. 1 is a schematic view of an exemplificative air compression apparatus 1 mounted on a vehicle 100 as a railroad vehicle. FIG. 2 is a top plan view schematically showing a mounting position of the air compression apparatus 1.

As shown in FIGS. 1 and 2, the air compression apparatus 1 includes two air compressor units 2. Alternatively, the air compression apparatus may include more than two of air compressor units.

The air compression apparatus 1 is installed, for example, underneath a floor 100a of the vehicle 100 (c.f. FIG. 1). The air compression apparatus 1 mounted on the vehicle 100 generates compressed air. The compressed air is used for actuating various pneumatic devices (not shown) mounted on the vehicle 100.

FIG. 2 is a schematic top plan view showing a part of the vehicle 100. The two-dot chain lines in FIG. 2 indicate the air compression apparatus 1 situated underneath the floor 100a of the vehicle 100, track rails 101, along which the vehicle 100 runs, and crossties 102.

The arrow in FIG. 2 indicates a width direction of the vehicle 100. The width direction of the vehicle 100 intersects orthogonally with a running direction of the vehicle 100. In short, the width direction of the vehicle 100 is parallel to the longitudinal direction of the crossties 102 which intersects at right angle with the extension direction of the rails 101. As shown in FIG. 2, the air compression apparatus 1 is placed at a position offset from a widthwise center of the vehicle 100 toward one side of the width direction.

As shown in FIGS. 1 and 2, the two air compressor units 2 situated underneath the floor 100a of the vehicle 100 are aligned in series along the running direction of the vehicle 100. The principle of the present embodiment is not limited to a specific position of the air compressor units 2.

[General Structure of Air Compression Apparatus]

Figure 3:
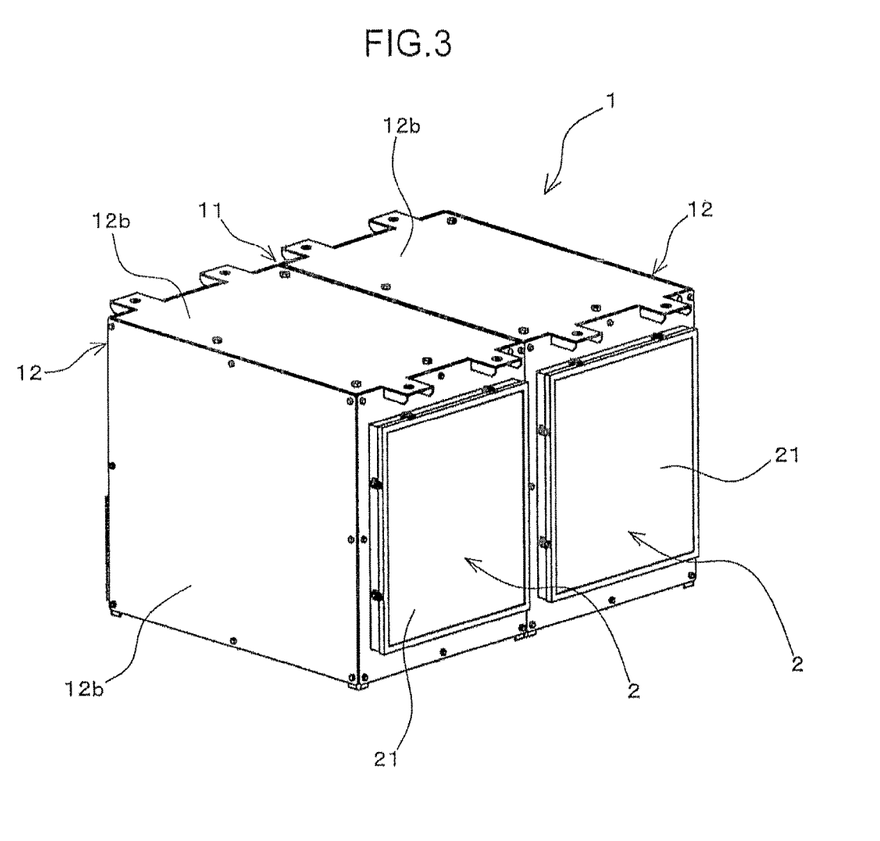
FIG. 3 is a schematic perspective view of the air compression apparatus shown in FIG. 1.
Figure 4:
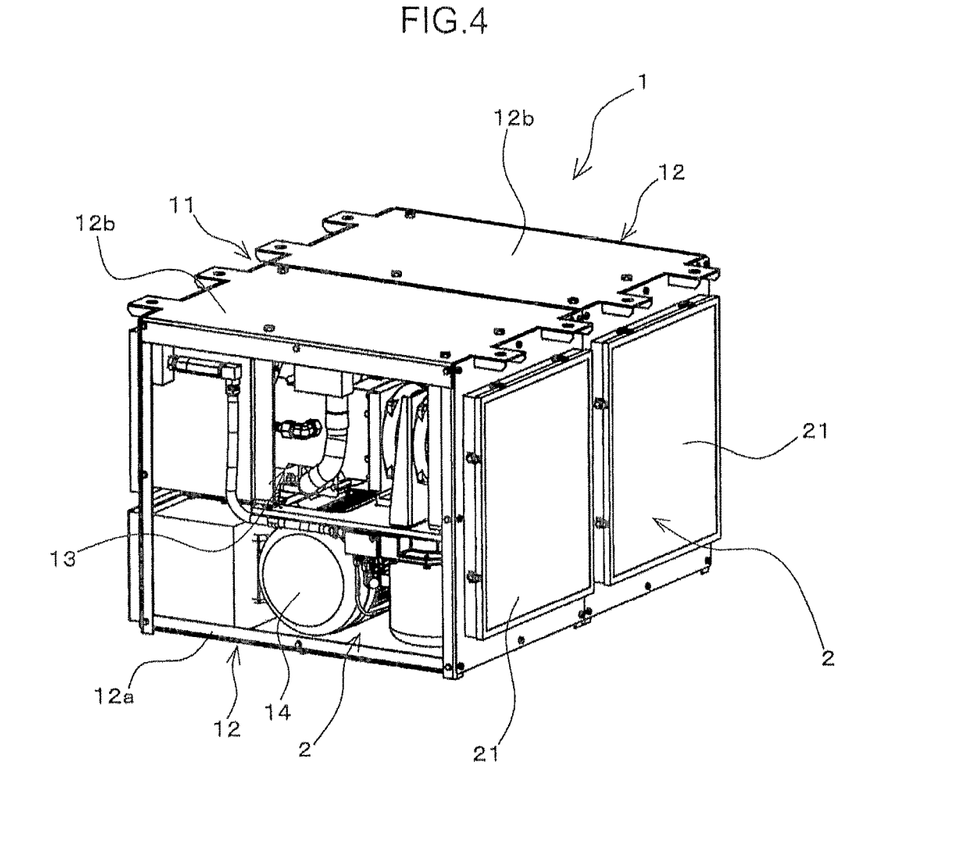
FIG. 4 is a perspective view of the air compression apparatus shown in FIG. 3.
Figure 5:
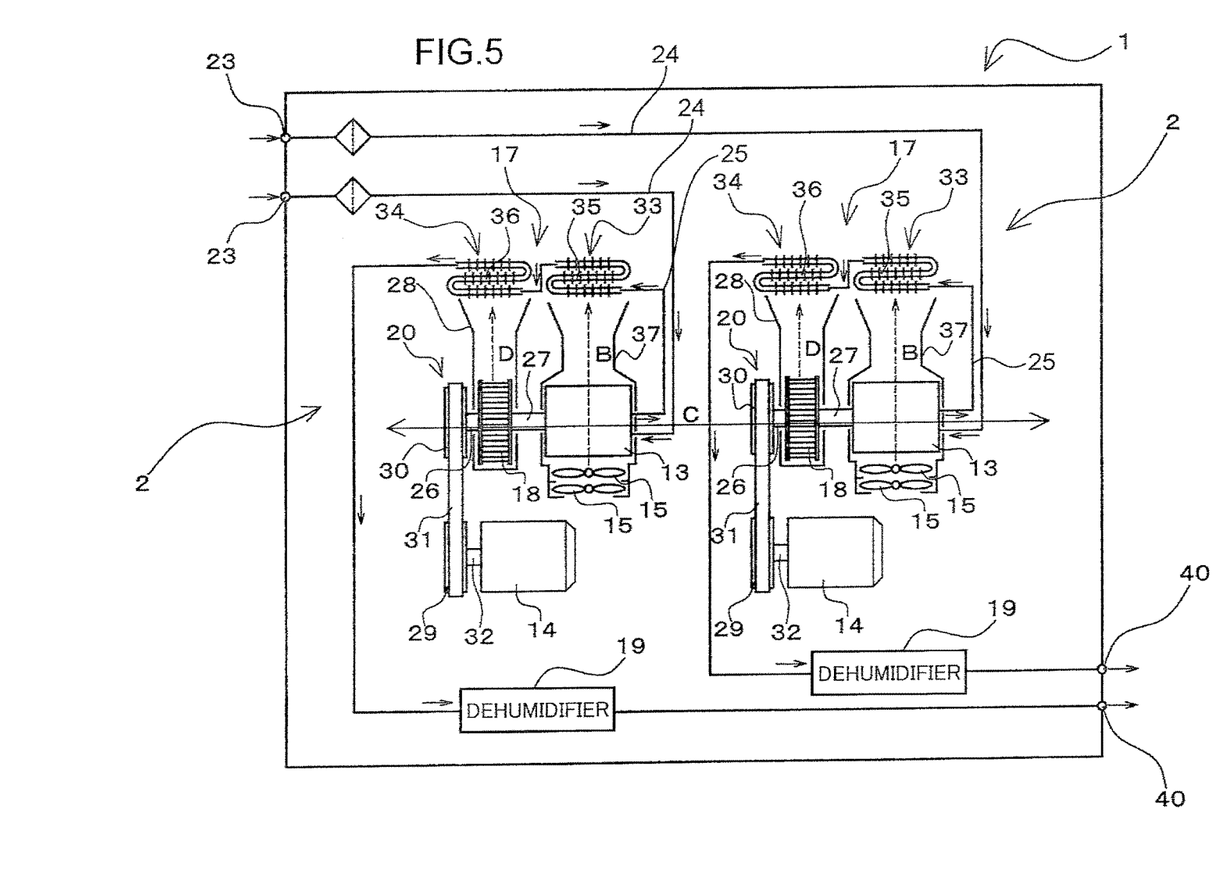
FIG. 5 is a schematic view showing a system configuration of the air compression apparatus shown in FIG. 3.

FIG. 3 is a schematic perspective view showing the air compression apparatus 1. FIG. 4 is another schematic perspective view of the air compression apparatus 1. A part of an outer surface is omitted from the air compression apparatus 1 shown in FIG. 4. Therefore, FIG. 4 shows an interior of the air compression apparatus 1. FIG. 5 is a schematic view showing a system configuration of the air compression apparatus 1 illustrated in FIG. 3.

As shown in FIGS. 3 and 4, the air compression apparatus 1 includes the two air compressor units 2 and a casing unit 11. The principle of the present embodiment may be applied to an air compression apparatus including more than two of the air compressor units.

The casing unit 11 includes two individual casings 12. Each of the individual casings 12 is used as the housing for holding each of the air compressor units 2. The principle of the present embodiment may be applied to an air compression apparatus including more than two of the individual casings.

As shown in FIG. 4, each of the individual casings 12 has a frame 12a shaped in a cuboid and panels 12b attached to the frame 12a. The panels 12b are attached to the frame 12a so as to surround the air compressor unit 2. One of the panels 12b of one of the two individual casings 12 is removed from the air compression apparatus 1 shown in FIG. 4.

Each of the individual casings 12 holds the air compressor units 2. The two individual casings 12 aligned in series are fixed to the vehicle 100. Therefore, the two air compressor units 2 are aligned in series and mounted onto the vehicle 100 by the casing unit 11.

[General Structure of Air Compressor Unit]

Figure 6:
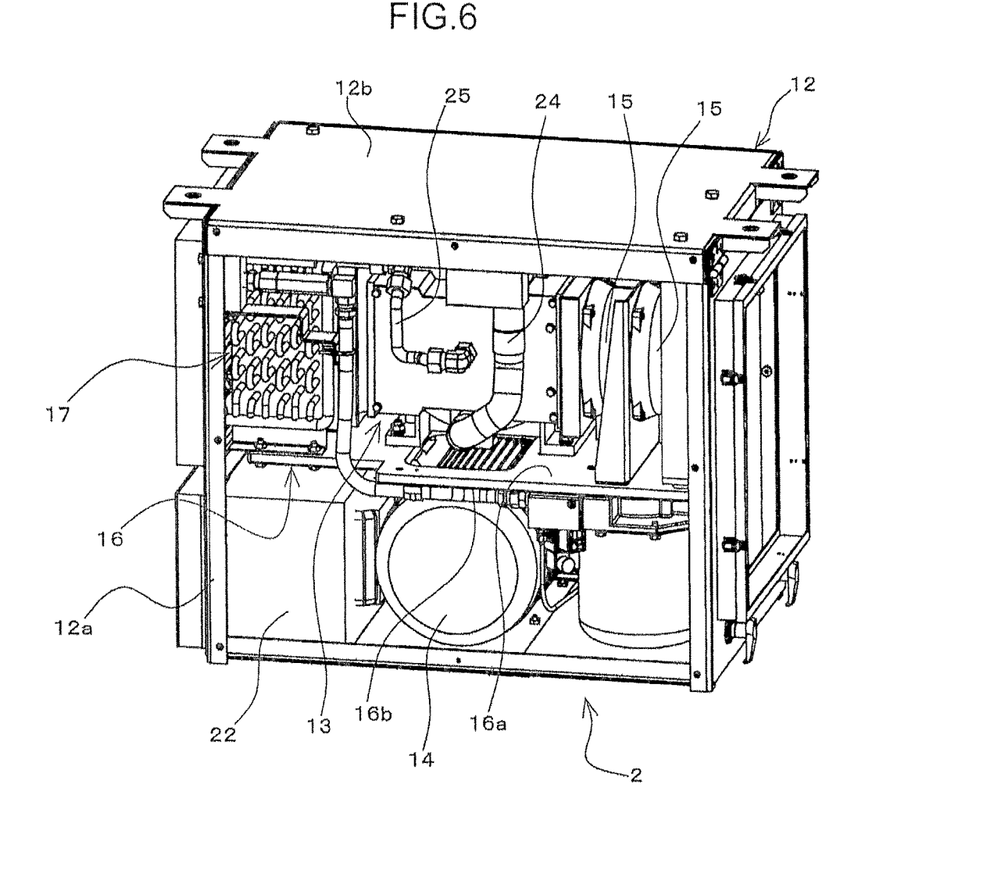
FIG. 6 is a schematic perspective view of an air compressor unit provided in the air compression apparatus illustrated in FIG. 4.
Figure 7:
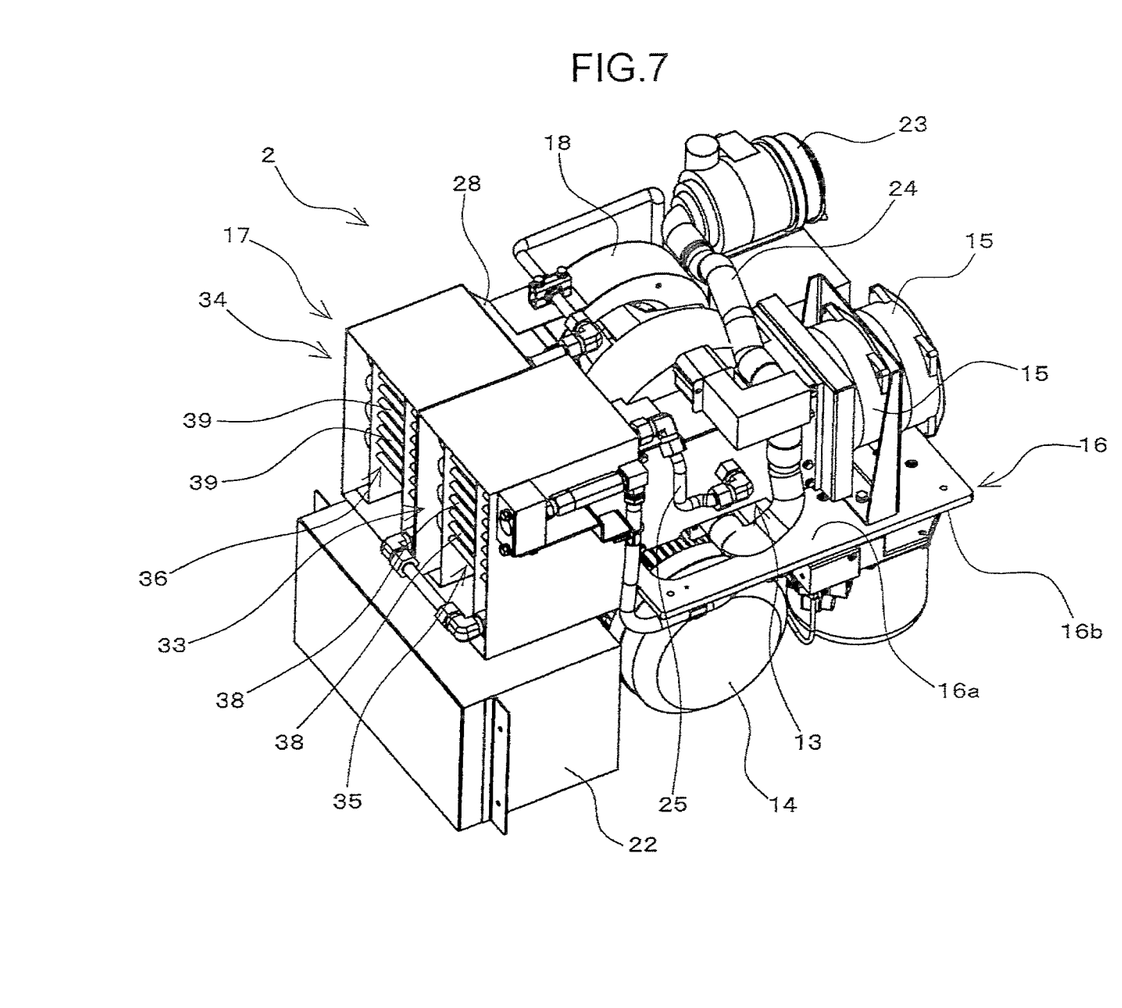
FIG. 7 is another schematic perspective view of the air compressor unit shown in FIG. 6.
Figure 8:
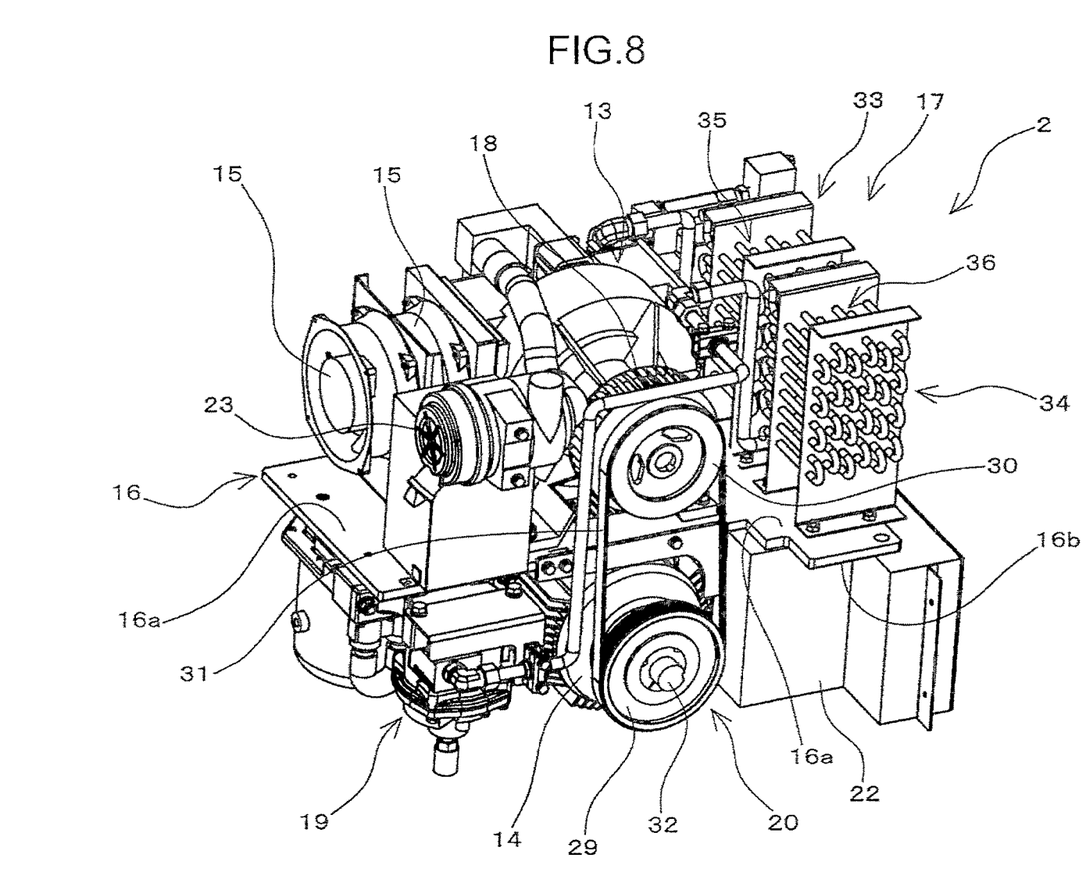
FIG. 8 is yet another schematic perspective view of the air compressor unit shown in FIG. 7.

FIG. 6 is a schematic perspective view showing one of the two air compressor units illustrated in FIG. 4. FIG. 7 is another schematic perspective view of the air compressor unit shown in FIG. 6. FIG. 7 is different in display angle of the air compressor unit from FIG. 6. FIG. 6 shows a part of the individual casing 12 around the air compressor unit 2 whereas the individual casing 12 is removed from the air compressor unit 2 shown in FIG. 7. FIG. 8 is yet another schematic perspective view of the air compressor unit 2. FIG. 8 is different in display angle of the air compressor unit 2 from FIG. 7. A part of components are removed from the air compressor unit 2 shown in FIG. 8. Therefore, FIG. 8 shows an internal structure of the air compressor unit 2.

As shown in FIGS. 3 to 8, each of the two air compressor units 2 has various elements such as an air compressor 13, an electric motor 14, a cooling fan 15 for cooling the air compressor 13, a base portion 16, an after-cooler 17, a cooling fan 18 for cooling the after-cooler 17, a dehumidifier 19, a driving-force transmitter 20, a filter 21 and a controller 22. Therefore, the air compression apparatus 1 according to the present embodiment includes two air compressors 12, two electric motors 14, two cooling fans 15, two after-coolers 17 and two cooling fans 18. The two air compressor units 2 may be structurally the same. Therefore, a structure of one of the two air compressor units 2 is described below.

[Air Compressor]

The air compressor 13 takes in air. The air compressor 13 then compresses the sucked air to generate compressed air. In the present embodiment, the first air compressor is exemplified by the air compressor 13 of one of the two air compressor units 2. The second air compressor is exemplified by the air compressor 13 of the other air compressor unit 2. The first compressed air is exemplified by the compressed air, which is generated by the air compressor 13 in the one of the two air compressor units 2. The second compressed air is exemplified by the compressed air generated by the air compressor 13 in the other air compressor unit 2.

The air compressor 13 may be a scroll air compressor including an oscillating scroll and a fixed scroll. The air compressor 13 is an oil-free air compressor configured to compress air without oil. The two air compressors 13 are adjacently aligned with each other in the casing unit 11. Accordingly a designer may give the air compression apparatus 1 small dimensional values. The two air compressors 13 are stored in the individual casings 12, respectively.

The air compressor unit 2 further includes an air intake 23 and an intake duct 24. External air outside the air compressor unit 2 is taken in from the air intake 23. Then, the sucked external air is guided in the air compressor unit 2 by the intake duct 24.

The air compressor 13 is provided with an intake port. The intake duct 24 is connected to an intake port of the air compressor 13. The air compressor 13 causes a negative-pressure environment in the intake duct 24 and the air intake 23. Accordingly, the external air is taken into the air compressor 13 through the air intake 23 and the intake duct 24. The air intake 23 incorporates a dust filter. The dust filter may remove fine particles (e.g. sand dust) from the external air when the external air taken in by the air compressor 13 passes through the air intake 23.

The air compressor 13 is driven by a driving force, which is generated by the electric motor 14. Meanwhile, oscillatory rotation around the fixed scroll happens to the oscillating scroll. Consequently, the air taken into the air compressor 13 is compressed between the oscillating scroll and the fixed scroll.

The air compressor unit 2 further includes a discharge duct 25. The air compressor 13 is provided with a discharge port. The compressed air generated under the compression between the oscillating scroll and the fixed scroll is discharged from the discharge port. The discharge duct 25 is connected to the discharge port and the after-cooler 17. The compressed air is supplied to the after-cooler 17 through the discharge port and the discharge duct 25.

In the present embodiment, each of the first and second air compressors is exemplified by the scroll air compressor 13. Alternatively, a screw air compressor may be used as the first and/or second air compressors. Further alternatively, a reciprocating air compressor may be used as the first and/or second air compressors. In this case, a rotational driving force generated by an electric motor for driving the first and/or second air compressors is converted to a reciprocating driving force by a crankshaft. The first and/or second air compressors use the reciprocating driving force to compress supplied air.

In the present embodiment, the air compressor 13 compresses supplied air without mixing oil in the air. Alternatively, the first and/or second air compressors may mix oil in supplied air, and then compress the oil-containing air.

[Filter]

FIGS. 3 and 4 schematically show the filter 21. The aforementioned air intake 23 takes in air which has flown into the individual casing 12 through the filter 21. Likewise, the cooling fan 15 (c.f. FIG. 5) takes in the air, which has flown into the individual casing 12 through the filter 21, and generates cooling wind for cooling the air compressor 13. The filter 21 removes foreign particles or substances from the air supplied into the individual casing 12. In the present embodiment, the first cooling fan is exemplified by the cooling fan 15 in one of the two air compressor units 2. The second cooling fan is exemplified by the cooling fan 15 in the other air compressor unit 2. The first cooling wind is exemplified by the cooling wind, which is generated by the cooling fan 15 of the one of the two air compressor units 2. The second cooling wind is exemplified by the cooling wind, which is generated by the cooling fan 15 in the other air compressor unit 2.

As shown in FIGS. 3 and 4, the filter 21 is attached to the individual casing 12. For example, the filter 21 may be a metal plate provided with holes. Alternatively, the filter 21 may be a metal mesh. The filter 21 has a flat surface defined by a metal plate or a metal mesh. The flat surface faces the air intake 23 and the cooling fan 15. FIG. 6 shows the individual casing 12 from which the filter 21 is removed. As shown in FIG. 6, the filter 21 is detachable from the individual casing 12.

[Electric Motor and Controller]

FIGS. 5 to 8 schematically show the electric motors 14. The two motors 14 are stored in the individual casings 12, respectively. The electric motor 14 functions as a drive source for driving the air compressor 13. The electric motor 14 generates a driving force. The driving force is given from the electric motor 14 to the driving-force transmitter 20. The driving-force transmitter 20 transmits the driving force to the air compressor 13. Accordingly, oscillatory rotation happens to the oscillating scroll of the air compressor 13.

FIGS. 6 to 8 schematically show the controller 22. The controller 22 supplies an electric current from an electricity source (not shown) to the electric motor 14. In addition, the controller 22 functions as a control device for controlling the electric motor 14. An electric current to be supplied to the electric motor 14 and the number revolutions (motor speed) of the electric motor 24 are controlled by the controller 22.

[Cooling Fan for Cooling Air Compressor]

FIGS. 5 to 8 schematically show the cooling fan 15 for cooling the air compressor 13. The cooling fan 15 is situated beside the air compressor 13. The cooling fan 15 generates cooling wind to cool the air compressor 13. The air compressor 13 is situated at the downstream of the cooling fan 15 in a flow direction of the cooling wind generated by the cooling fan 15. Therefore, the air compressor 13 may receive the cooling wind generated by the cooling fan 15. Accordingly, the air compressor 13 is appropriately cooled by the cooling wind. In the present embodiment, the cooling fan 15 is situated so as to blow the cooling wind directly toward the air compressor 13. Therefore, the air compressor 13 may be efficiently cooled.

The cooling fan 15 may be an axial-flow fan having a propeller rotatable about an axis. The cooling fan 15 faces the air compressor 13. The cooling fan 15 is driven by another electric motor provided separately from the electric motor 14.

In the present embodiment, two cooling fans 15 aligned along the flow direction of the cooling wind are provided for each of the air compressors 13. Alternatively, a single cooling fan may be provided for each of the air compressors 13. Further alternatively, three or more cooling fans aligned along the flow direction of the cooling wind may be provided for each of the air compressors 13.

As shown in FIG. 5, the cooling fan 15 may have a cover surrounding the propeller. The cover may be coupled to a cover surrounding a housing of the air compressor 13. In this case, the cooling wind generated by the cooling fan 15 is confined in a space surrounded by the covers, so that the air compressor 13 is efficiently cooled.

The dashed arrow B in FIG. 5 generally indicates the flow direction of the cooling wind generated by the cooling fan 15. In the present embodiment, the first direction is exemplified by the direction indicated by the arrow B.

The arrow C in FIG. 5 indicates the alignment direction of the two air compressors 13. In the present embodiment, the second direction is exemplified by the direction indicated by the arrow C.

As shown in FIG. 5, the alignment direction of the two air compressors 13 (arrow C) intersects with an air blowing direction of the cooling fan 15 (arrow B). Therefore, the cooling wind from the cooling fans 15 cools a corresponding one of the air compressors 13, and then flows toward the downstream of the corresponding air compressor 13 without interference with the other air compressor 13.

In the present embodiment, the alignment direction of the two air compressors 13 (arrow C) intersects with the air blowing direction of the cooling fan 15 (arrow B) substantially at right angle. Alternatively, an alignment direction of air compressors may intersect with a flow direction of cooling wind at another angle (e.g. 45 degrees). The principle of the present embodiment is not limited to a specific angle between the alignment direction of the air compressors and the flow direction of the cooling wind. An air compressor may be efficiently cooled if there is no interference between cooling wind after cooling the air compressor and another air compressor.

[Base Portion]

FIGS. 6 to 8 schematically show the base portion 16. Various components such as the air compressor 13 and the electric motor 14 are fixed to the base portion 16. For example, the base portion 16 may be a steel member. In the present embodiment, the base portion 16 is a flat plate. As described above, the base portion 16 is provided for each of the air compressor units 2. The base portions 16 are held by the individual casings 12, respectively.

The base portion 16 includes a flat first surface 16a and a flat second surface 16b. The second surface 16b is opposite to the first surface 16a. The second surface 16b is substantially parallel to the first surface 16a.

The air compressor 13 is fixed to the first surface 16a. On the other hand, the electric motor 14 is fixed to the second surface 16b. Therefore, the air compressor 13 and the electric motor 14 sandwich the base portion 16. The air compression apparatus 1 is mounted onto the vehicle so that the air compressor 13 and the electric motor 14 vertically align. In this case, the two air compressors 13, the two cooling fans 15 and the two cooling fans 18 are arranged along a common horizontal plane.

The air compressor 13 is vertically apart from the electric motor 14 by a thickness of the base portion 16. The cooling fan 15 is situated beside the air compressor 13 to send cooling wind toward the air compressor 13. Like the air compressor 13, the cooling fan 15 is attached to the first surface 16a. Therefore, the base portion 16 is interposed between the cooling fan 15 and the base portion 16. Accordingly, the base portion 16 may thermally isolate the electric motor 14 from a set of the air compressor 13 and the cooling fan 15. This means that heat generated from the electric motor 14 becomes less influential to cooling operation for the air compressor 13 by the cooling fan 15. Consequently, the cooling fan 15 may efficiently cool the air compressor 13.

As shown in FIG. 8, the controller 22 is closer to the second surface 16b than the first surface 16a. In the present embodiment, the controller 22 is not fixed to the second surface 16b. Alternatively, the controller 22 may be fixed to the second surface 16b.

In the present embodiment, when the air compression apparatus 1 is mounted onto the vehicle 100, the air compressor 13 and the cooling fan 15 are situated over the base portion 16 whereas the electric motor 14 and the controller 22 are situated underneath the base portion 16. Alternatively, when the air compression apparatus 1 is mounted onto the vehicle 100, the air compressor 13 and the cooling fan 15 may be situated underneath the base portion 16 whereas the electric motor 14 and the controller 22 may be situated over the base portion 16.

[Cooling Fan for Cooling after-Cooler]

FIGS. 5, 7 and 8 show the cooling fan 18 for cooling the after-cooler 17. The cooling fan 18 may be an air blower which is driven by a driving force of the electric motor 14.

The cooling fan 18 may be a centrifugal blower (e.g. a sirocco fan). The cooling fan 18 generates cooling wind for cooling the after-cooler 17. Consequently, the after-cooler 17 is cooled by the cooling wind, which is generated by the cooling fan 18. In the present embodiment, the third cooling fan is exemplified by the cooling fan 18 in one of the two air compressor units 2. The fourth cooling fan is exemplified by the cooling fan 18 in the other air compressor unit 2. The third cooling wind is exemplified by the cooling wind, which is generated by the cooling fan 18 in the one of the two air compressor units 2. The fourth cooling wind is exemplified by the cooling wind, which is generated by the cooling fan 18 in the other air compressor unit 2.

The cooling fans 18 are attached to the air compressors 13, respectively. The cooling wind generated by the cooling fan 18 is directly blown onto the after-cooler 17.

As shown in FIG. 5, a rotary shaft 26 of the cooling fan 18 is coaxial with a rotary shaft 27 of the air compressor 13. The rotary shafts 26, 27 are linearly aligned with each other. Therefore, the cooling fan 18 is integrally rotated together with the air compressor 13. The cooling fan 18 is provided with an air inlet. The air inlet is situated near the rotary shaft 27 of the air compressor 13. The air compressor 13 is situated beside the air inlet of the cooling fan 18.

When the cooling fan 18 is rotated by a driving force of the electric motor 14, the cooling fan 18 may cause a negative-pressure environment around the rotary shaft 27 of the air compressor 13. Consequently, air around the rotary shaft 27 of the air compressor 13 is taken in through the inlet port at a center of the cooling fan 18. Under rotation of the cooling fan 18, the air supplied into the cooling fan 18 flows in a radial direction of the cooling fan 18, and then is sent outward as cooling wind from the cooling fan 18.

As shown in FIGS. 5 and 7, the air compressor unit 2 further includes a duct 28. The duct 28 guides the cooling wind toward the after-cooler 17, the cooling wind having been sent from the cooling fan 18. Consequently, the cooling wind is blown onto the after-cooler 17 to cool the after-cooler 17. The duct 28 and a cover of the cooling fan 18 are removed from the air compressor unit 2 shown in FIG. 8.

The dashed arrow D in FIG. 5 generally shows a flow direction of the cooling wind generated by each of the cooling fans 18. As shown in FIG. 1, the air blowing direction of the cooling fan 18 (arrow D) is coincident with the air blowing direction of the cooling fan 15 (arrow B). Therefore, the air blowing direction of the cooling fan 18 (arrow D) is substantially parallel to the air blowing direction of the cooling fan 15 (arrow B).

[Driving-Force Transmitter]

FIGS. 5 and 8 show the driving-force transmitter 20. The driving-force transmitter 20 receives a driving force from the electric motor 14. The driving-force transmitter 20 then transmits the received driving force to the cooling fan 18 and the air compressor 13 to drive the cooling fan 18 and the air compressor 13. The driving-force transmitter 20 includes a drive pulley 29, an idler pulley 30 and a drive belt 31.

The drive pulley 29 is rotated together with a rotary shaft 32 of the electric motor 14. The idler pulley 30 is rotated together with the rotary shaft 26 of the cooling fan 18. The drive belt 31 is an endless belt wound around the drive pulley 29 and the idler pulley 30. The drive belt 31 transmits a driving force from the electric motor 14 to the cooling fan 18 and the air compressor 13.

When the rotary shaft 32 of the electric motor 14 is rotated under a driving operation of the electric motor 14, the drive pulley 29 is rotated together with the rotary shaft 32. Meanwhile, the drive belt 31 is circulated with the rotation of the drive pulley 29. Therefore, the idler pulley 30 is rotated. The rotary shaft 26 of the cooling fan 18 is rotated together with the idler pulley 30, so that the cooling fan 18 is activated. As described above, the rotary shaft 27 of the air compressor 13 is coaxial with the rotary shaft 26 of the cooling fan 18. Therefore, the rotary shaft 27 of the air compressor 13 is rotated together with the rotary shaft 26 of the cooling fan 18. Accordingly, the air compressor 13 is activated together with the cooling fan 18.

[After-Cooler]

FIGS. 5 to 8 show the after-cooler 17. The after-cooler 17 cools the compressed air generated by the air compressor 13. As described above, the after-cooler 17 is connected to the air compressor 13 via the discharge duct 25. The after-cooler 17 cools the compressed air supplied through the air compressor 13 and the discharge duct 25. As shown in FIGS. 6 to 8, the after-cooler 17 is fixed to the first surface 16a of the base portion 16.

As shown in FIGS. 5, 7 and 8, the after-cooler 17 includes a first cooler 33 and a second cooler 34.

The first cooler 33 includes a first flow passage 35 through which the compressed air generated by the air compressor 13 passes. The first flow passage 35 is cooled by the cooling wind which is generated by the cooling fan 15 for cooling the air compressor 13. The first cooler 33 is situated at the downstream of the air compressor 13 in the flow direction of the cooling wind generated by the cooling fan 15.

After the cooling wind generated by the cooling fan 15 cools the air compressor 13, the cooling wind reaches the first flow passage 35 of the first cooler 33. The first flow passage 35 is externally cooled to cause a temperature drop of the compressed air flowing through the first flow passage 35.

As shown in FIG. 5, the air compressor unit 2 further includes a duct 37. The duct 37 extends downstream from the air compressor 13. After the cooling wind generated by the cooling fan 15 cools the air compressor 13, the cooling wind is guided from the air compressor 13 to the first flow passage 35 by the duct 37.

The second cooler 34 is connected to the first cooler 33. The second cooler 34 includes a second flow passage 36 connected to the downstream of the first flow passage 35. The compressed air which is cooled in the first cooler 33 is sent to the second flow passage 36.

The cooling wind generated by the cooling fan 18 is directly blown onto the second flow passage 36 of the second cooler 34. Accordingly, the second flow passage 36 is efficiently cooled by the cooling wind from the cooling fan 18. The second flow passage 36 is subjected to cooling so that the compressed air flowing through the second flow passage 36 is cooled. Consequently, the compressed air generated by the air compressor 13 is cooled in the first cooler 33, and then cooled in the second cooler 34.

The first cooler 33 is situated beside the air compressor 13. The second cooler 34 is situated beside the cooling fan 18. When the air compression apparatus 1 is mounted onto the vehicle 100, the first and second coolers 33, 34 are aligned along a common horizontal plane.

[Dehumidifier]

FIGS. 5 and 8 schematically show a dehumidifier 19. The dehumidifier 19 dehumidifies the compressed air which has been cooled by the after-cooler 17. The dehumidifier 19 is connected to the downstream of the second cooler 34. The compressed air cooled by the second cooler 34 is sent to the dehumidifier 19. The dehumidifier connected to the after-cooler 17 is also connected to a compressed-air outlet 40 for sending the compressed air to the outside. The compressed air sent from the compressed-air outlet 40 is supplied to an accumulator tank (not shown) which is placed outside the casing unit 11. The accumulator tank accumulates the compressed air.

The compressed air sent to the dehumidifier 19 after the cooling in the second cooler 34 is dehumidified by the dehumidifier 19. The compressed air after the dehumidification by the dehumidifier 19 is then sent from the compressed-air outlet 40, and supplied to the accumulator tank.

[Operation of Air Compression Apparatus]

An operation of the air compression apparatus 1 is described. The solid arrow in FIG. 5 generally indicates an air flow during the operation of the air compression apparatus 1.

While the air compression apparatus 1 is driven, a negative-pressure environment generated by the air compressor 13 causes external air to be taken in from the air intake 23. The air compressor 13 is driven by the electric motor 14 operating under control of the controller 22. The air compressor 13 is cooled by cooling wind which is generated by the cooling fan 15.

The air supplied from the air intake 23 is taken into the air compressor 13. The sucked air is then compressed by the air compressor 13 and becomes compressed air. The compressed air generated by the air compressor 13 is sent to the after-cooler 17.

The compressed air is sent from the air compressor 13 to the first flow passage 35 of the first cooler 33. The first cooler 33 is cooled by the cooling wind which has been used for cooling the air compressor 13. Therefore, the compressed air is appropriately cooled while the compressed air passes through the first flow passage 35. The compressed air is then sent from the first flow passage 35 to the second flow passage 36 of the second cooler 34. The second flow passage 36 is externally cooled by the cooling water, which is generated by the cooling fan 18, so that the compressed air is efficiently cooled while the compressed air passes through the second flow passage 36.

The compressed air which is cooled by the after-cooler 17 is sent to the dehumidifier 19. The dehumidifier 19 dehumidifies the compressed air. The compressed air which is dehumidified by the dehumidifier 19 is sent out from the compressed-air outlet 40, and supplied to the accumulator tank.

[Function/Effect of Air Compression Apparatus]

According to the aforementioned embodiment, the air compressors 13 are aligned with each other in a direction intersecting with the air blowing direction of the cooling fan 15 of the air compression apparatus 1 (arrow B). Therefore, after the cooling wind from each of the cooling fans 15 cools each of the air compressors 13, a flow of the cooling wind becomes less likely to be interfered by the other air compressor 13. The cooling wind may smoothly flow toward the downstream, so that the cooling fan 15 may efficiently cool the air compressor 13. If a designer designs the air compression apparatus 1, in which the air compressors 13 are arranged closely, in order to downsize the air compression apparatus 1, the cooling wind may flow smoothly. Accordingly, the principle of the present embodiment may suitably meet a demand on downsizing the air compression apparatus 1.

According to the aforementioned embodiment, the cooling wind from each of the cooling fans 15 is sent to each of the air compressors 13. As compared to a structure having a branched duct for guiding cooling wind from a single cooling fan to a plurality of air compressors, the aforementioned cooling structure is less likely to cause pressure loss in the cooling wind. Therefore, the cooling wind may smoothly flow from the cooling fan 15 to the air compressor 13. Consequently, the cooling fan 15 may efficiently cool the air compressor 13.

According to the aforementioned embodiment, the air blowing direction of the cooling fan 18 (arrow D) is coincident with the air blowing direction of the cooling fan 15 (arrow B). Therefore, if a designer designs the air compression apparatus 1 so that the air compressor 13 is placed adjacently to the after-cooler 17 in order to downsize the air compression apparatus 1, the cooling wind may flow smoothly. Consequently, the cooling fan 15 may efficiently cool the air compressor 13. Like the cooling wind from the cooling fan 15, the cooling wind from the cooling fan 18 may flow smoothly. Accordingly, the cooling fan 18 may efficiently cool the after-cooler 17.

According to the aforementioned embodiment, the cooling wind from the cooling fan 15 is less likely to interfere with the cooling wind from the cooling fan 18. Therefore, the air compressor 13 and the after-cooler 17 may be efficiently cooled by the cooling fans 15, 18, respectively.

According to the aforementioned, each of the cooling fans 18 may directly send cooling wind to the after-cooler 17 which corresponds to each of the air compressors 13. As compared to a structure having a branched duct for guiding cooling wind from a single cooling fan to a plurality of after-coolers, the aforementioned cooling structure is less likely to cause pressure loss in the cooling wind. Therefore, the cooling wind may smoothly flow from the cooling fan 18 to the after-cooler 17. Consequently, the cooling fan 18 may efficiently cool the after-cooler 17.

According to the aforementioned embodiment, the cooling fan 15 is an axial-flow fan facing the air compressor 13. Therefore, the cooling wind may flow smoothly from the cooling fan 15. Consequently, the cooling fan 15 may efficiently cool the air compressor 13.

According to the aforementioned embodiment, the cooling fan 18 is a centrifugal blower. The rotary shaft 26 of the cooling fan 18 is coaxial with the rotary shaft 27 of the air compressor 13. Therefore, the cooling wind from each of the cooling fans 18 may be blown directly onto the after-cooler 17 corresponding to each of the air compressors 13. Since a designer may design the air compression apparatus 1 so that the cooling fan 18 is adjacent to the air compressor 13, the designer may give the air compression apparatus 1 small dimensional values. Since the rotary shaft 26 of the cooling fan 18 is coaxial with the rotary shaft 27 of the air compressor 13, a driving-power transmitting mechanism such as a gear mechanism may not be required. In this aspect, the designer may give the air compression apparatus 1 small dimensional values.

According to the aforementioned embodiment, when the air compression apparatus 1 is mounted onto the vehicle 100, the air compressor 13 and the electric motor 14 are vertically aligned with each other. The air compressor 13 is not situated along a common horizontal plane together with the electric motor 14, so that the air compressor 13 may be mounted onto the vehicle 100 without an excessively large mounting area.

According to the aforementioned embodiment, the cooling fan 18 is driven by a driving force of the electric motor 14. Therefore, the driving force of the electric motor 14 for driving the air compressor 13 is utilized for driving the cooling fan 18. Accordingly, it is not necessary to provide a driving source of the cooling fan 18 separately, so that a designer may give the air compression apparatus 1 small dimensional values 1.

According to the aforementioned, when the cooling fan 18 takes in surrounding air, a flow of the air is generated around the air compressor 13 near the air inlet of the cooling fan 18. Consequently, the air compressor 13 may be efficiently cooled.

According to the aforementioned embodiment, the cooling fan 18 is a centrifugal blower which may easily generate a large volume of cooling wind. Therefore, the cooling fan 18 may efficiently cool the after-cooler 17. The after-cooler 17 may be efficiently cooled, so that the compressed air generated by the air compressor 13 may also be efficiently cooled.

According to the aforementioned embodiment, the rotary shaft 26 of the cooling fan 18 is coaxial with the rotary shaft 27 of the air compressor 13. Generally, air around the rotary shaft 27 of the air compressor 13 is likely to be heated by heat, which is generated from the air compressor 13. In the present embodiment, since the air around the rotary shaft 27 of the air compressor 13 is easily taken in by the cooling fan 18, there is no excessive temperature rise in components such as a bearing attached to the rotary shaft 27 of the air compressor 13. A scroll air compressor including an oscillating scroll and a fixed scroll is used as the air compressor 13. In this case, the cooling fan 18 for cooling the after-cooler 17 is placed at the side of the oscillating scroll. Therefore, a designer may design the air compression apparatus 1 so that the rotary shaft 26 of the cooling fan 18 becomes coaxial with the rotary shaft 27 of the air compressor 13. Consequently, there is no excessive temperature rise in components (e.g. a bearing) attached to the rotary shaft 27 of the air compressor 13.

According to the aforementioned embodiment, the cooling fan 15 is driven by an electric motor provided separately from the electric motor 14 for driving the air compressor 13. Therefore, even after the driving operation of the air compressor 13 is stopped, the air compressor 13 may be cooled by the cooling fan 15.

According to the aforementioned embodiment, the cooling wind generated by the cooling fan 15 is used to cool the air compressor 13. As a result of the cooling operation, there is a temperature rise in the cooling wind. The cooling wind then reaches the first cooler 33. Since the hot compressed air which is generated by the air compressor 13 is sent to flow through the first cooler 33, the compressed air is cooled by the cooling wind which has been used for cooling the air compressor 13. The compressed air cooled in the first cooler 33 is then cooled by the second cooler 34, which is cooled by the cooling wind with a relatively low temperature from the cooling fan 18. Therefore, the cooling winds from the cooling fans 15, 18 may sequentially cool the compressed air. The first cooler 33 is situated beside the air compressor 13 whereas the second cooler 34 is situated beside the cooling fan 18. Therefore, a designer may design the air compression apparatus 1 so that the air compressor 13, the cooling fan 18 and the after-cooler 17 are arranged in a narrow apace. Consequently, a designer may give the air compression apparatus 1 small dimensional values. The cooling wind used for cool the air compressor 13 is further used for cooling the after-cooler 17, so that the cooling fan 18 may have low cooling capacity. Accordingly, a designer may select a small device as the cooling fan 18. Consequently, the designer may give the air compression apparatus small dimensional values.

According to the aforementioned embodiment, the air compressor 13 and the electric motor 14 are vertically aligned with each other. The controller 22 for the electric motor 14 is situated beside the electric motor 14. Therefore, a designer may design the air compression apparatus 1 so that the controller 22 is away from the air compressor 13. Consequently, heat generated from the air compressor 13 becomes less influential to the controller 22. The designer may design the air compression apparatus 1 so that the electric motor 14 is close to the controller 22. Consequently, the designer may give the air compression apparatus small dimensional values.

[Modifications]

A person skilled in the art may make various modified air compression apparatuses on the basis of the principle of the aforementioned embodiment.

(1) With regard to the aforementioned embodiment, the air compression apparatus 1 uses a scroll air compressor. Alternatively, the air compression apparatus may use a screw air compressor. Further alternatively, the air compression apparatus may use a reciprocating air compressor configured to convert a rotational driving force from an electric motor to a reciprocating driving force through a crankshaft. The air compression apparatus may use an air compressor configured to compress air mixed with oil.

(2) With regard to the aforementioned embodiment, the air compressor 13 and the electric motor 14 are vertically aligned with each other. Alternatively, the air compressor and the electric motor may be aligned with each other in another direction.

(3) With regard to the aforementioned embodiment, the air blowing direction of the cooling fan 15 for cooling the air compressor 13 intersects substantially orthogonally with the alignment direction of the air compressors 13. Alternatively, the intersecting angle between the air blowing direction of the cooling fan for cooling the air compressor and the alignment direction of the air compressors 13 may be selected from various angles other than 90 degrees. If a preferable intersecting angle is set, the cooling wind from each of the cooling fans for cooling the air compressors may flow without interference with the remaining air compressors after the cooling wind cools the corresponding one of the air compressors.

(4) With regard to the aforementioned embodiment, the air compression apparatus 1 is placed underneath a floor of the vehicle 100. Alternatively, the air compression apparatus may be arranged in any suitable place other than underneath the floor of the vehicle. For example, the air compression apparatus may be mounted onto an upper portion of a roof of the vehicle.

(5) With regard to the aforementioned embodiment, the after-cooler 17 is cooled by not only the cooling fan 18 for cooling the after-cooler 17 but also the cooling fan 15 for cooling the air compressor 13. Alternatively, the after-cooler may be cooled without the cooling wind for cooling the air compressor 13.

(6) With regard to the aforementioned embodiment, the air compressor 13 and the electric motor 14 attached to the base portion 16 are stored in the individual casing 12. Alternatively, the air compression apparatus may not have the individual casings. For example, instead of the individual casings, the air compression apparatus may have a single casing for storage of air compressors and electric motors. In this case, a common base portion may be provided to allow attachment of the air compressors and the electric motors. The common base portion may be held by the single casing.

The air compression apparatus described in the context of the aforementioned embodiment primarily has the following features.

(1) The air compression apparatus according to one aspect of the aforementioned embodiment includes a first air compressor configured to generate first compressed air, a first cooling fan configured to send first cooling wind in a first direction to cool the first air compressor, and a second air compressor aligned with the first air compressor in a second direction intersecting with the first direction. The second air compressor generates second compressed air.

According to the aforementioned configuration, the first and second air compressors are aligned with each other in the second direction intersecting with the first direction along which the first cooling fan sends the first cooling wind. Therefore, if the second air compressor is situated near the first air compressor, the first cooling fan may efficiently cool the first air compressor.

(2) In the aforementioned configuration, the air compression apparatus may further include a second cooling fan configured to send second cooling wind in the first direction to cool the second air compressor.

According to the aforementioned configuration, the first air compressor and the second after-cooler are cooled by the first and second cooling fans, respectively. Therefore, as compared to a structure in which the first and second air compressors are cooled by a common cooling fan, each of the first and second cooling winds may reach each of the first and second air compressors under low pressure loss. Accordingly, the first and second air compressors may be efficiently cooled.

(3) In the aforementioned configuration, the air compression apparatus may further include a first after-cooler configured to cool the first compressed air, and a third cooling fan configured to generate third cooling wind for cooling the first after-cooler. The third cooling fan may send the third cooling wind in the first direction.

According to the aforementioned configuration, like the first cooling wind, the third cooling wind is sent in the first direction, so that there is little interference between the first cooling wind and the third cooling wind. Accordingly, each of the first air compressor and the first after-cooler may be efficiently cooled.

(4) In the aforementioned configuration, the air compression apparatus may further include a second after-cooler configured to cool the second compressed air, and a fourth cooling fan configured to generate fourth cooling wind for cooling the second after-cooler. The third cooling fan may be situated to blow the third cooling wind directly to the first after-cooler. The fourth cooling fan may be situated to blow the fourth cooling wind directly to the second after-cooler.

According to the aforementioned configuration, the first and second after-coolers are cooled by the third and fourth cooling fans, respectively. Therefore, as compared to a structure in which the first and second after-coolers are cooled by a common cooling fan, the third and fourth cooling winds may reach the first and second after-coolers under low pressure loss, respectively. Accordingly, each of the first and second after-coolers may be efficiently cooled.

(5) In the aforementioned configuration, the first cooling fan may be an axial-flow fan facing the first air compressor.

According to the aforementioned configuration, the first cooling fan is an axial-flow fan facing the first air compressor, so that the first cooling wind may reach the first air compressor without any branched duct. Therefore, the first air compressor may be efficiently cooled with the first cooling wind.

(6) In the aforementioned configuration, the third cooling fan may be a centrifugal blower which rotates coaxially with the first air compressor.

According to the aforementioned configuration, the third cooling fan is a centrifugal blower which rotates coaxially with the first air compressor, so that the third cooling fan may be situated near the first air compressor. Therefore, a designer may give the air compression apparatus small dimensional values.

(7) In the aforementioned configuration, the air compression apparatus may further include an electric motor configured to drive the first air compressor. The first air compressor and the electric motor may be aligned vertically with each other.

According to the aforementioned configuration, the first air compressor and the electric motor are vertically aligned with each other. Therefore, the air compression apparatus may have a small occupancy area on a horizontal plane.

INDUSTRIAL APPLICABILITY

The principle of the aforementioned embodiment may be widely applied to air compression apparatuses mounted onto vehicles.

This application is based on Japanese Patent application No. 2014-101847 filed in Japan Patent Office on May 15, 2014, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. An air compression apparatus configured to be mounted on a vehicle, comprising:
    a first air compressor configured to generate first compressed air;
    a first cooling fan configured to send first cooling wind in a first direction to cool the first air compressor;
    a second air compressor aligned with the first air compressor in a second direction intersecting with the first direction, the second air compressor generating second compressed air;
    a second cooling fan configured to send second cooling wind in the first direction to cool the second air compressor;
    a first after-cooler configured to cool the first compressed air;
    a second after-cooler configured to cool the second compressed air;
    a third cooling fan configured to generate third cooling wind; and
    a fourth cooling fan configured to generate fourth cooling wind,
    wherein the third cooling fan is situated to blow the third cooling wind directly to the first after-cooler,
    wherein the fourth cooling fan is situated to blow the fourth cooling wind directly to the second after-cooler,
    wherein the first after-cooler is cooled by the first cooling wind from the first cooling fan and the third cooling wind from the third cooling fan, and
    wherein the second after-cooler is cooled by the second cooling wind from the second cooling fan and the fourth cooling wind from the fourth cooling fan.

2. The air compression apparatus according to claim 1, wherein the first cooling fan is an axial-flow fan facing the first air compressor.

3. The air compression apparatus according to claim 1, wherein the third cooling fan is a centrifugal blower which rotates coaxially with the first air compressor.

4. The air compression apparatus according to claim 1, further comprising an electric motor configured to drive the first air compressor, wherein the first air compressor and the electric motor are aligned vertically with each other.

5. The air compression apparatus according to claim 1, wherein the second cooling fan is an axial-flow fan facing the second air compressor.

6. The air compression apparatus according to claim 1, wherein the fourth cooling fan is a centrifugal blower which rotates coaxially with the second air compressor.

7. The air compression apparatus according to claim 1, further comprising a second electric motor configured to drive the second air compressor, and wherein the second air compressor and the second electric motor are aligned vertically with each other.

8. The air compression apparatus according to claim 1, wherein the first after-cooler comprises a first cooler and a second cooler operatively connected to the first cooler, and wherein the first compressed air generated by the first air compressor is first cooled in the first cooler, and is then cooled in the second cooler.

9. The air compression apparatus according to claim 8, wherein the first cooler is situated beside the first air compressor and the second cooler is situated beside the third cooling fan, and wherein, when the air compression apparatus is mounted onto the vehicle, the first and second coolers are aligned along a common horizontal plane.

10. The air compression apparatus according to claim 8, wherein the first cooler is situated at the downstream of the first air compressor in the flow direction of the first cooling wind generated by the first cooling fan, wherein the first cooler includes a first flow passage through which the first compressed air generated by the first air compressor passes, and wherein the first flow passage is cooled by the first cooling wind which is generated by the first cooling fan for cooling the first air compressor.

11. The air compression apparatus according to claim 10, wherein, after the first cooling wind generated by the first cooling fan cools the first air compressor, the first cooling wind reaches the first flow passage of the first cooler, and wherein the first flow passage is externally cooled by the first cooling wind from the first cooling fan to cause a temperature drop of the first compressed air flowing through the first flow passage.

12. The air compression apparatus according to claim 10, wherein the second cooler includes a second flow passage connected to the downstream of the first flow passage, wherein the first compressed air which is cooled in the first cooler is sent to the second flow passage, and wherein the second flow passage is cooled by the third cooling wind from the third cooling fan.

13. The air compression apparatus according to claim 12, wherein the third cooling wind generated by the third cooling fan is directly blown onto the second flow passage of the second cooler.

14. The air compression apparatus according to claim 1, wherein the first cooling wind from the first cooling fan cools not only the first air compressor but also the first after-cooler.

15. The air compression apparatus according to claim 1, wherein the second cooling wind from the second cooling fan cools not only the second air compressor but also the second after-cooler.

* * * * *